United States Patent [19]

Warner

[11] Patent Number: 4,906,008
[45] Date of Patent: Mar. 6, 1990

[54] MECHANICAL SEAL

[75] Inventor: Dale J. Warner, Palm Harbor, Fla.

[73] Assignee: Gits Bros. Mfg. Co., Tampa, Fla.

[21] Appl. No.: 210,767

[22] Filed: Jun. 23, 1988

[51] Int. Cl.⁴ .......................... F16J 15/34; F16J 15/38
[52] U.S. Cl. ......................................... 277/40; 277/38;
277/85; 277/87; 277/93 SD
[58] Field of Search .............. 277/81 R, 93 R, 93 SD,
277/37, 38–43, 85, 87

[56] References Cited

U.S. PATENT DOCUMENTS

| | | | |
|---|---|---|---|
| 2,189,197 | 2/1940 | Cerny | 277/42 |
| 2,756,080 | 7/1956 | Andresen et al. | 277/40 |
| 3,467,395 | 9/1969 | Kon | 277/37 |
| 3,784,213 | 1/1974 | Voitik | 277/85 X |
| 3,841,642 | 10/1974 | Kirker, Jr. | 277/40 |
| 4,136,885 | 1/1979 | Uhrner | 277/42 X |
| 4,389,051 | 6/1983 | Mullaney | 277/81 R X |

OTHER PUBLICATIONS

EG&G SEALOL, Type 7 Seal.
Dayton, Type 68 Seal.

*Primary Examiner*—Allan N. Shoap

[57] ABSTRACT

A positive bearing housing seal is provided in which the stationary, and possibly a reducer having the same peripheral shaped of the stationary, is employed for installing and aligning the stationary and the rotary with respect to the shaft. A flat surface of the stationary is moved against a flat surface of the rotary until the flat surface of the stationary engages a machine wall or, if a reducer is used, a flat surface of the reducer. The shaft is then rotated to establish squareness. The stationary is then removed from the shaft, reversed in the axial direction, and reinstalled such that a flexible extension thereof, including a peripheral bead, is inserted into engagement with the inner surface of an annular opening in the machine wall or an annular opening in the reducer.

6 Claims, 1 Drawing Sheet

MECHANICAL SEAL

BACKGROUND OF THE INVENTION

The present invention relates to a positive bearing housing seal which eliminates packing and O-rings between the seal and the machine housing and relates to a method for installing such a positive bearing housing seal.

SUMMARY OF THE INVENTION

The object of the invention is to provide a positive bearing housing seal which eliminates the necessity for packing O-rings between the seal and the machine housing and which also provides a method for installing such a bearing housing seal for squareness with respect to the rotary shaft of the machine.

The above object is achieved by providing a positive bearing housing seal which comprises six basic parts and, in one embodiment, a seventh basic part as a reducer, for sealing a bearing and providing squareness with respect to the machine and the shaft.

A major portion of the seal is employed in the method of assembling the seal for squareness with respect to the machine and the shaft as will be set forth hereinbelow.

BRIEF DESCRIPTION OF THE DRAWING

Other objects, features and advantages of the invention, its organization, construction and operation will be best understood from the following description taken in conjunction with the accompanying drawing on which.

DESCRIPTION OF THE PREFERRED EMBODIMENTS

Figure 1:
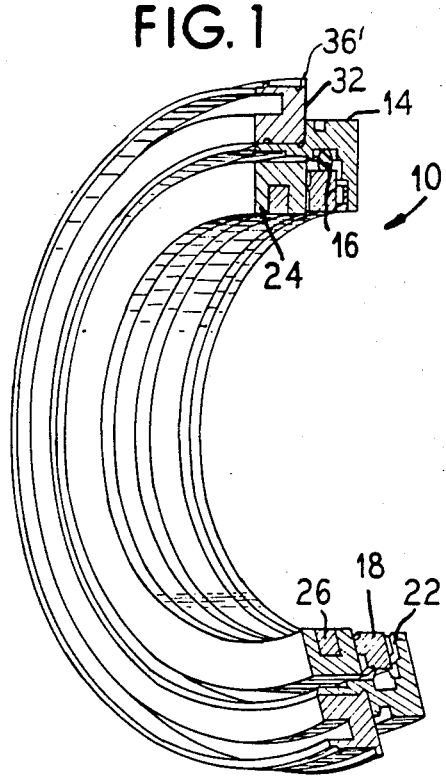
FIG. 1 is a perspective sectional view of a positive bearing housing seal constructed in accordance with the present invention.
Figure 2:
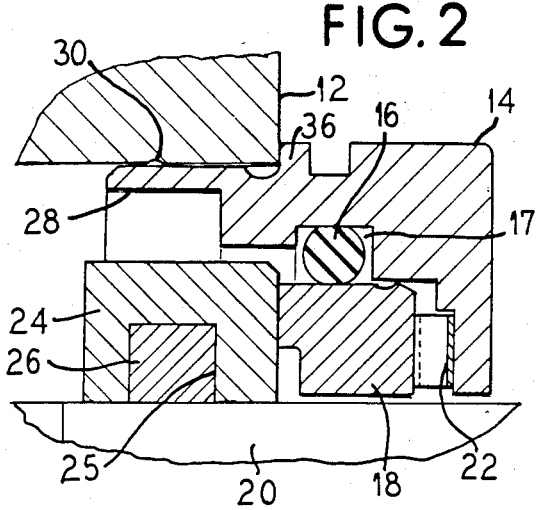
FIG. 2 is an enlarged sectional view taken at the upper end of the sectional view of FIG. 1.

Referring first to FIGS. 1 and 2, a shaft seal, constructed in accordance with the present invention is generally illustrated at 10 for sealing the space between a bearing or other machine housing 12 for a rotating shaft 20. The seal assembly 10 includes a seal housing ring 14, which may be made of aluminum 6061, and has an internal groove 17 which houses an O-ring 16 which may be composed of "Viton ®". A stationary ring element 18 in the housing 14 is sealingly engaged by the O-ring 16. This stationary ring element 18 may be constructed of Carbon P 659 RC material.

The stationary ring element 18 is urged by a wave spring 22 against a rotary ring element 24 mounted on the shaft 20. This rotary ring element 24 has an internal groove 25 which mounts a gasket 26 bottomed on the shaft 20. The gasket 26 may also be composed of a "Viton®" material.

The housing 14 has an axially extending flexible ring portion 28 with an external peripheral bead 30 therearound for engaging the interior surface of the shaft housing 12. The seal housing ring 14 has an external peripheral flange 36 which abuts the outer face of the housing 12.

As shown in FIGS. 1 and 3–7, the seal of this invention may also be provided with a reducer ring 32 which includes a flange 36' for abutting the housing 12. This reducer ring 32 has the same peripheral design as the housing 14 and includes the flexible portion with a similar bead 34.

Referring now to FIGS. 3–7, and bearing in mind that the structure is essentially the same with or without the reducer, the method and installation will be set forth.

Figure 4:
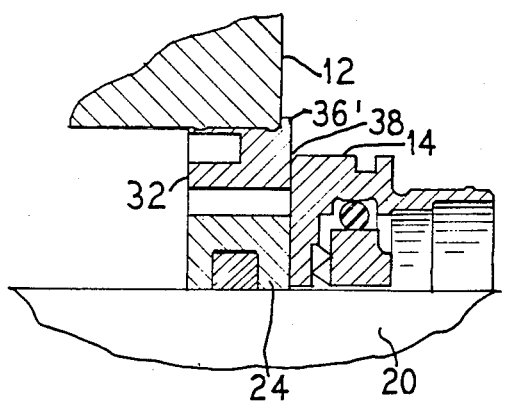
FIGS. 3–7 are sectional views similar to FIG. 2, but including an adapter and illustrating the method of installation of the bearing housing or shaft seal of the present invention.
Figure 3:
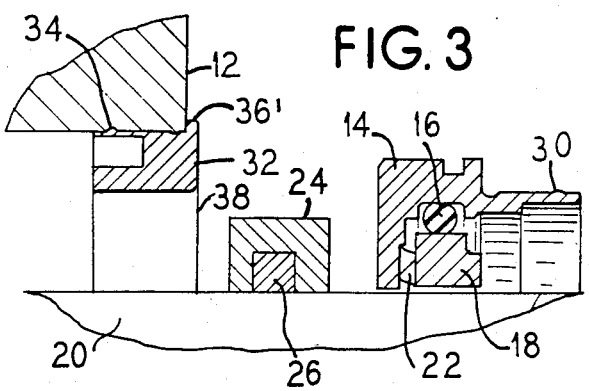

Referring to FIG. 3, and assuming a reducer 32 is employed with the flange 36' abutting the element 12 and with the bead 34 engaging the inner surface, the rotary ring 24, with the gasket 26, is placed on the shaft 20. The elements 14, 16, 18 and 22 are also placed on the shaft, but in the direction opposite to that illustrated in FIG. 2. These elements are then moved to the left in FIG. 3 until there is an alignment along the line 38 as shown in FIG. 4. The shaft is then rotated to obtain squareness, for example two revolutions.

Figure 5:
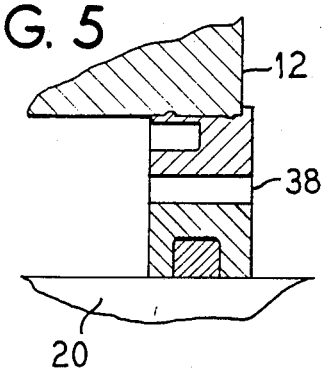

The elements 14, 16, 18 and 22 are then removed so that the structure of FIG. 5 is generated with the elements 32 and 24 being aligned along the line 38.

Figure 6:
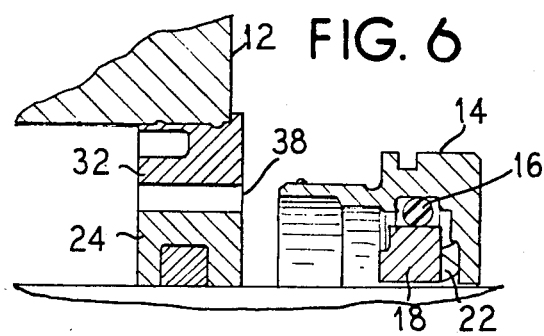

Referring now to FIG. 6, the elements 14, 16, 18 and 22 are reversed in direction and moved onto the shaft towards the elements 32 and 24 which, without the adapter 32, could be the elements 12 and 24.

Figure 7:
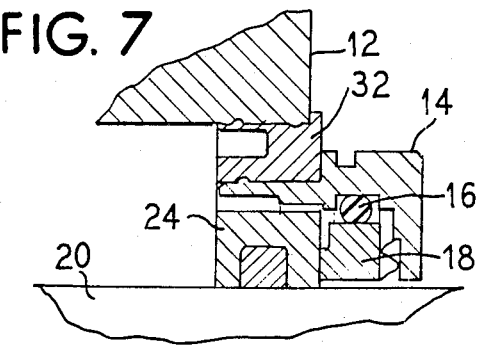

The elements 14, 16, 18 and 22 are then pressed against the elements 32 and 24 (or 12 and 24 as the case may be) so that the structure of FIG. 7 arises.

Although I have described my invention by reference to particular embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A mechanical seal for sealing the space between a shaft housing with an axially extending, radially facing inner wall and a radially extending, axially facing end face that intersect at a corner, and a rotating shaft in the shaft housing which comprises a one piece seal housing ring having an internal groove, an axially extending annular flexible portion, a peripheral bead about said annular flexible portion and an external peripheral flange adjacent said annular flexible portion, a stationary seal ring for freely surrounding said shaft having a radially extending, axially facing sealing face, a rotary seal ring for mounting and rotating with said shaft and having a sealing face opposing the sealing face of the stationary seal ring, a spring in said housing ring urging said stationary seal ring against said rotary seal ring in face-to-face sealing engagement, an elastomeric seal ring in said internal groove of said housing ring surrounding said stationary seal ring accommodating axial movement of the stationary seal ring relative to the housing ring and sealing the stationary seal ring and housing ring, said axially extending annular flexible portion of said housing ring adapted to be press inserted into the shaft housing with said peripheral bead on said annular portion tightly engaging said inner wall of the shaft housing and with said flange of the housing ring having a radially extending, axially facing surface abutting said end face of the shaft housing including said corner and an annular surface of said end face surrounding said corner.

2. The mechanical seal of claim 1, wherein said elastomeric seal ring is an O-ring.

3. The mechanical seal of claim 1, wherein said spring is a wave spring.

4. The mechanical seal of claim 1, wherein said rotary seal ring has an internal groove and a gasket is mounted in said groove for sealing engagement therewith and with said shaft.

5. The mechanical seal of claim 1 including an adapter ring forming a radial extension of said seal housing by providing a more radially inward inner wall, end face, and corner, said adapter ring surrounding the flexible portion of said seal housing ring and being in sealed engagement therewith along its inner wall and having an axially extending flexible ring portion for press fitting onto said inner wall of said shaft housing together with an external peripheral flange having a radially extending, axially facing surface abutting said end face of the adapter ring including the corner and an annular surface surrounding the corner of said adapter ring.

6. A mechanical seal adapted to be press fitted into a shaft housing and abutting against a radially extending, axially facing end face of the housing to seal the annular space between the housing and shaft and which comprises an adapter ring having an axially extending annular portion press fitting into said seal housing in sealed engagement therewith and an external peripheral flange for abutting said end face of the shaft housing, a seal housing ring having a flexible axially extending ring portion press fitted into said adapter ring and an external peripheral flange abutting the adapter ring, said seal housing ring having an internal groove, an O-ring in said groove, a stationary seal ring in sealing engagement with said O-ring and having a radially extending seal facing, a rotating seal ring for sealingly mounting around the shaft having a radially extending seal face opposing the seal face of said stationary seal ring, and a wave spring in said seal housing ring biasing the seal face of said stationary seal ring against the seal face of the rotating seal ring in rotatable sealing engagement.

* * * * *